United States Patent
Chen

(10) Patent No.: US 9,430,049 B2
(45) Date of Patent: Aug. 30, 2016

(54) ILLUMINATED KEYBOARD

(71) Applicant: Primax Electronics Ltd., Neihu, Taipei (TW)

(72) Inventor: Chung-Yuan Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 623 days.

(21) Appl. No.: 13/950,759

(22) Filed: Jul. 25, 2013

(65) Prior Publication Data

US 2014/0168087 A1 Jun. 19, 2014

(30) Foreign Application Priority Data

Dec. 19, 2012 (TW) .................. 101148403

(51) Int. Cl.
*G01D 11/28* (2006.01)
*G06F 3/02* (2006.01)
*H01H 13/83* (2006.01)

(52) U.S. Cl.
CPC ............ *G06F 3/0202* (2013.01); *H01H 13/83* (2013.01); *H01H 2219/044* (2013.01); *H01H 2219/062* (2013.01); *H01H 2219/064* (2013.01)

(58) Field of Classification Search
CPC ..... G06F 3/0202; H01L 13/84; H01L 13/86; H01L 13/88; H01L 15/00; H01L 27/00; H01L 2219/044; H01L 2219/062; H01L 2219/004

See application file for complete search history.

(56) References Cited

U.S. PATENT DOCUMENTS

| | | | | |
|---|---|---|---|---|
| 6,917,000 B2* | 7/2005 | Yen | ...................... | H01H 13/702 200/5 A |
| 8,431,849 B2* | 4/2013 | Chen | ................... | H01H 13/023 200/310 |
| 2010/0128427 A1* | 5/2010 | Iso | ........................ | G06F 1/1616 361/679.09 |
| 2011/0227847 A1* | 9/2011 | Yoshiyama | ............ | G06F 3/041 345/173 |
| 2011/0272262 A1* | 11/2011 | Chen | ...................... | H01H 13/83 200/5 A |
| 2013/0161498 A1* | 6/2013 | Kawata | ................. | G01J 1/0425 250/227.31 |
| 2014/0138227 A1* | 5/2014 | Chen | ...................... | H01H 13/83 200/5 A |
| 2014/0168934 A1* | 6/2014 | Chen | ...................... | H01H 13/83 362/23.03 |

* cited by examiner

*Primary Examiner* — Ali Alavi
(74) *Attorney, Agent, or Firm* — Kirton McConkie; Evan R. Witt

(57) ABSTRACT

An illuminated keyboard includes a key structure, a sensor board, a light source, a light guide plate, an adhesive layer, and a bottom plate. The sensor board includes a key wiring region for sensing a depressing action of the key structure and thereby generates a key signal. The light source is used for emitting a light beam to the light guide plate. The sensor board is made of a light-transmissible material. The sensor board is disposed over the light guide plate. At least one edge region of the sensor board is coated with a light-shading material or mixed with a light-shading material. Moreover, the at least one edge region of the sensor board is bent to enclose at least one edge of the light guide plate in order to prevent lateral light leakage of the illuminated keyboard.

20 Claims, 17 Drawing Sheets

ILLUMINATED KEYBOARD

FIELD OF THE INVENTION

The present invention relates to a keyboard, and more particularly to an illuminated keyboard.

BACKGROUND OF THE INVENTION

With the development of science and technology, the commercially-available illuminated keyboard not only has a backlight function but also has the ability of effectively preventing light leakage. Consequently, the quality and texture of the illuminated keyboard can be exhibited when the illuminated keyboard is used in a dim environment.

FIG. 1 is a schematic view illustrating a conventional illuminated keyboard. As shown in FIG. 1, the conventional illuminated keyboard 10 comprises a key structure 11, a sensor board 21, a light guide plate 41, a light source 43, and a reflecting plate 51. At least one edge region 52 of the reflecting plate 51 is bent upwardly to enclose at least one edge region 42 of the light guide plate 41 in order to prevent the light beam from being leaked out through a lateral side of the illuminated keyboard 10.

Generally, it is difficult to bend the reflecting plate, and the reflecting plate is not very flexible. Consequently, the process of bending the reflecting plate to enclose the light guide plate is complicated and costly. Moreover, since the current illuminated keyboards are gradually thinner and thinnest, some kinds of illuminated keyboards may even have no reflecting plates. If reflecting plate is not included in an illuminated keyboard, it cannot use the reflecting plate to enclose the light guide plate, and thus the lateral light leakage problem occurs. Moreover, since the reflecting plate is opaque, the reflecting plate can only be disposed under the light guide plate and bent upwardly to enclose the lateral surface of the light guide plate. In other words, the reflecting plate fails to be disposed over the light guide plate. The ways of bending the reflecting plate downwardly to enclose the lateral surface of the light guide plate and installing light-transmissible/light-shading structures (not shown) on the reflecting plate fail to achieve both the purpose of preventing the light beam from being leaked out through the lateral side of the illuminated keyboard and the vacant space between every two adjacent keycaps.

SUMMARY OF THE INVENTION

The present invention provides an illuminated keyboard that is thin and can effectively prevent light leakage.

The present invention also provides an illuminated keyboard for preventing the light beam from being leaked out through a lateral side of the illuminated keyboard and the vacant space between every two adjacent keycaps.

In accordance with an aspect of the present invention, there is provided an illuminated keyboard. The illuminated keyboard includes a key structure, a sensor board, a light source, and a light guide plate. When the key structure is depressed, a key signal is correspondingly triggered. The sensor board includes a key wiring region for sensing a depressing action of the key structure and thereby generates the key signal. The light source is used for emitting a light beam. The light guide plate is located at a side of the light source for transferring the light beam. Moreover, at least one edge region of the sensor board is bent to enclose at least one edge region of the light guide plate and thereby prevents lateral light leakage of the illuminated keyboard.

In accordance with another aspect of the present invention, there is provided an illuminated keyboard. The illuminated keyboard includes a sensor board, plural key patterns, a light source, and a light guide plate. The sensor board includes a key wiring region for sensing a touching action of a user and thereby generates a corresponding key signal. The plural key patterns are identified by the user. When one of the key patterns is touched, the key signal is triggered. The light source is used for emitting a light beam. The light guide plate is located at a side of the light source for transferring the light beam. Moreover, at least one edge region of the sensor board is bent to enclose at least one edge region of the light guide plate and thereby prevents lateral light leakage of the illuminated keyboard.

In accordance with another aspect of the present invention, there is provided an illuminated keyboard. The illuminated keyboard includes a sensor board, a first substrate, a second substrate, a spacer layer or a partition plate, and a light source. The sensor board is used for sensing a touching action of a user and thereby generates a corresponding key signal. The first substrate includes a first electrode pattern. The second substrate includes a second electrode pattern. The second substrate is made of a light-guiding material. The spacer layer or the partition plate is arranged between the first electrode pattern and the second electrode pattern. The light source is used for emitting a light beam to the second substrate. Moreover, at least one edge region of the first substrate is bent to enclose at least one edge region of the second substrate and thereby prevents lateral light leakage of the illuminated keyboard.

In accordance with another aspect of the present invention, there is provided an illuminated keyboard. The illuminated keyboard includes a sensor board, a first substrate, a second substrate, a partition plate, and a light source. The sensor board is used for sensing a touching action of a user and thereby generates a corresponding key signal. The first substrate includes a first electrode pattern. The second substrate includes a second electrode pattern. The second substrate is made of a light-guiding material. The partition plate is arranged between the first substrate and the second substrate. The light source is used for emitting a light beam to the second substrate. Moreover, at least one edge region of the partition plate is bent to enclose at least one edge region of the second substrate and thereby prevents lateral light leakage of the illuminated keyboard.

In accordance with another aspect of the present invention, there is provided an illuminated keyboard. The illuminated keyboard includes a sensor board, a first substrate, a second substrate, a partition plate, and a light source. The sensor board is used for sensing a touching action of a user and thereby generates a corresponding key signal. The first substrate includes a first electrode pattern. The second substrate includes a second electrode pattern. The partition plate is arranged between the first substrate and the second substrate. The partition plate is made of a light-guiding material. The light source is used for emitting a light beam to the partition plate. Moreover, at least one edge region of the first substrate is bent to enclose at least one edge region of the partition plate and thereby prevents lateral light leakage of the illuminated keyboard.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional illuminated keyboard, the present invention provides an improved illuminated keyboard. In the conventional illuminated keyboard, an edge region of a reflecting plate is bent to enclose an edge region of a light guide plate. In the illuminated keyboard of the present invention, an edge region of a sensor board is bent to enclose an edge region of the light guide plate in order to prevent lateral light leakage.

Figure 1:
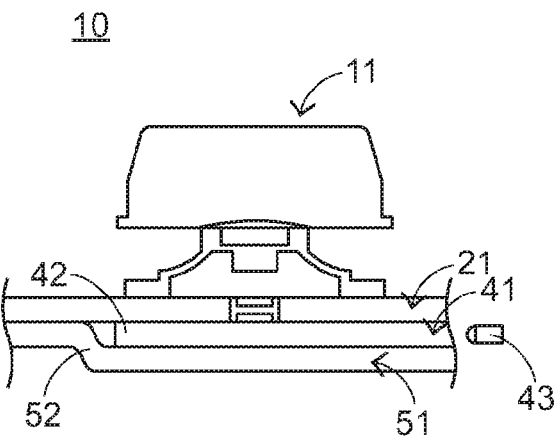
FIG. 1 is a schematic view illustrating a conventional illuminated keyboard.
Figure 2:
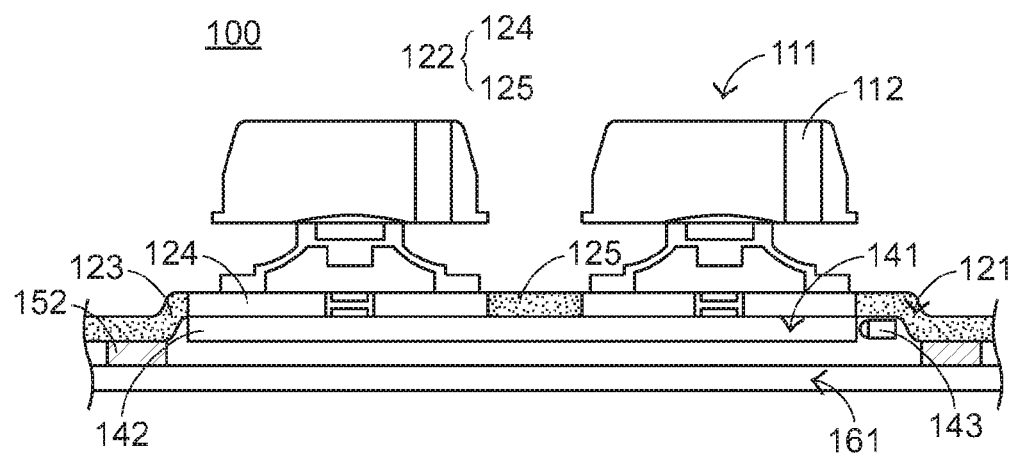
FIG. 2 is a schematic side view illustrating an illuminated keyboard according to a first embodiment of the present invention.

FIG. 2 is a schematic side view illustrating an illuminated keyboard according to a first embodiment of the present invention. As shown in FIG. 2, the illuminated keyboard 100 comprises a key structure 111, a contact type sensor board 121, a light source 143, a light guide plate 141, an adhesive layer 152, and a bottom plate 161. The contact type sensor board 121 comprises a key wiring region 122 and plural edge region regions 123. The key wiring region 122 is used for sensing a depressing action of the key structure 111 and thereby generates a corresponding key signal. The key wiring region 122 may be further divided into different sub-regions. In this embodiment, the key wiring region 122 is divided into a key triggering sub-region 124 corresponding to the key structure 111 and a key spacing sub-region 125 which is outside the key triggering sub-region 124. The light source 143 is used for emitting a light beam to the light guide plate 141. When the light beam is transferred within the light guide plate 141 to a position corresponding to the key structure 111, the total internal reflection path within the light guide plate 141 is destroyed by the microstructures or dots (not shown) on the light guide plate 141. Consequently, the light beam is directed upwardly to a light-outputting part 112 of the key structure 111 in order to illuminate a number or a symbol of the key structure 111.

As shown in FIG. 2, the contact type sensor board 121 is made of a light-transmissible material. The contact type sensor board 121 is disposed over the light guide plate 141. Moreover, at least one edge region 123 of the contact type sensor board 121 is coated with a light-shading material or mixed with the light-shading material. In addition, the at least one edge region 123 of the contact type sensor board 121 is bent to enclose at least one edge region 142 of the light guide plate 141 in order to prevent lateral light leakage of the illuminated keyboard 100. Please refer to FIG. 2 again. The key spacing sub-region 125 of the contact type sensor board 121 is also coated with the light-shading material or mixed with the light-shading material in order to prevent the light beam from being leaked out upwardly through the vacant space between every two adjacent key structures 111. In other words, the light beam fails to be leaked out through a lateral side of the illuminated keyboard 100, and the light beam also fails to be leaked out through the vacant space between every two adjacent key structures 111. Under this circumstance, the quality and texture of the overall illuminated keyboard 100 will be enhanced. Moreover, the adhesive layer 152 is used for allowing the bent edge region 123 of the contact type sensor board 121 to be adhered onto the bottom plate 161. Consequently, the edge region 142 of the light guide plate 141 can be always enclosed by the bent edge region 123 of the contact type sensor board 121.

Figure 3A:
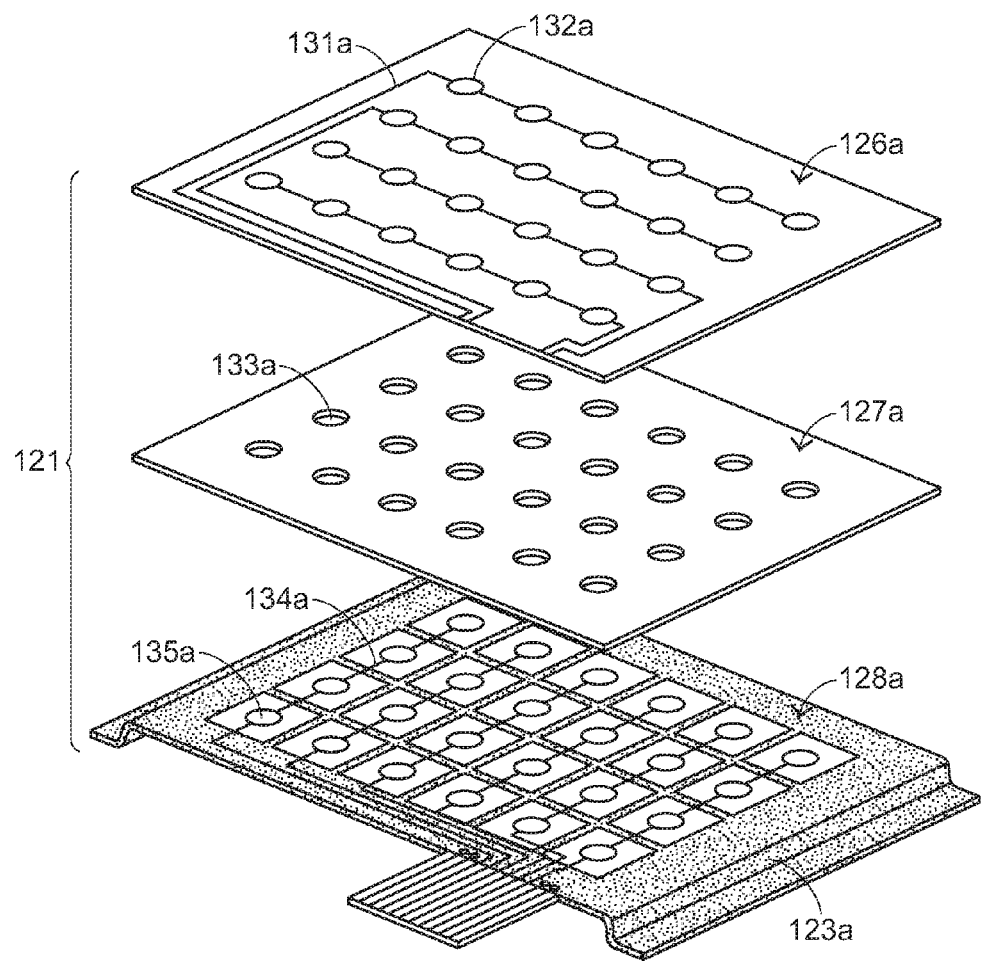
FIGS. 3A, 3B and 3C are schematic exploded views illustrating three examples of the contact type sensor board used in the illuminated keyboard of FIG. 2.
Figure 3B:
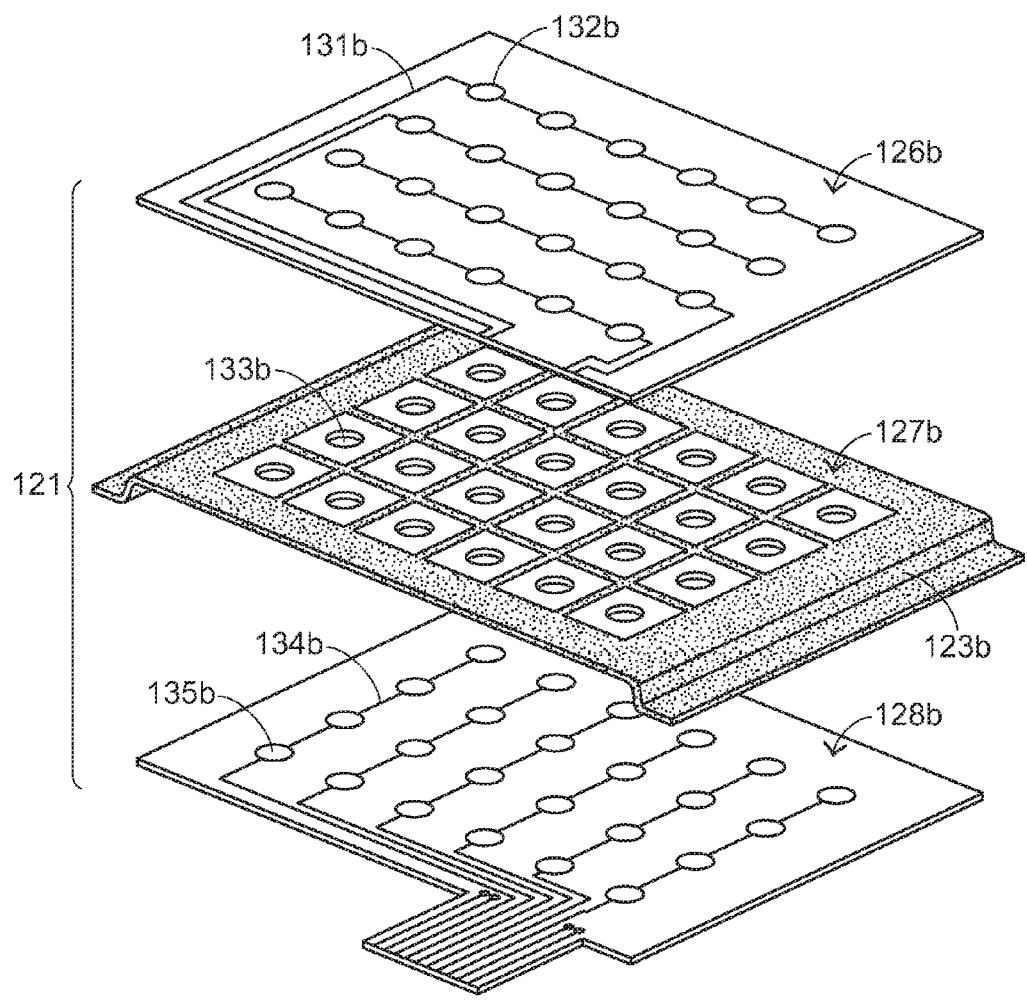
Figure 3C:
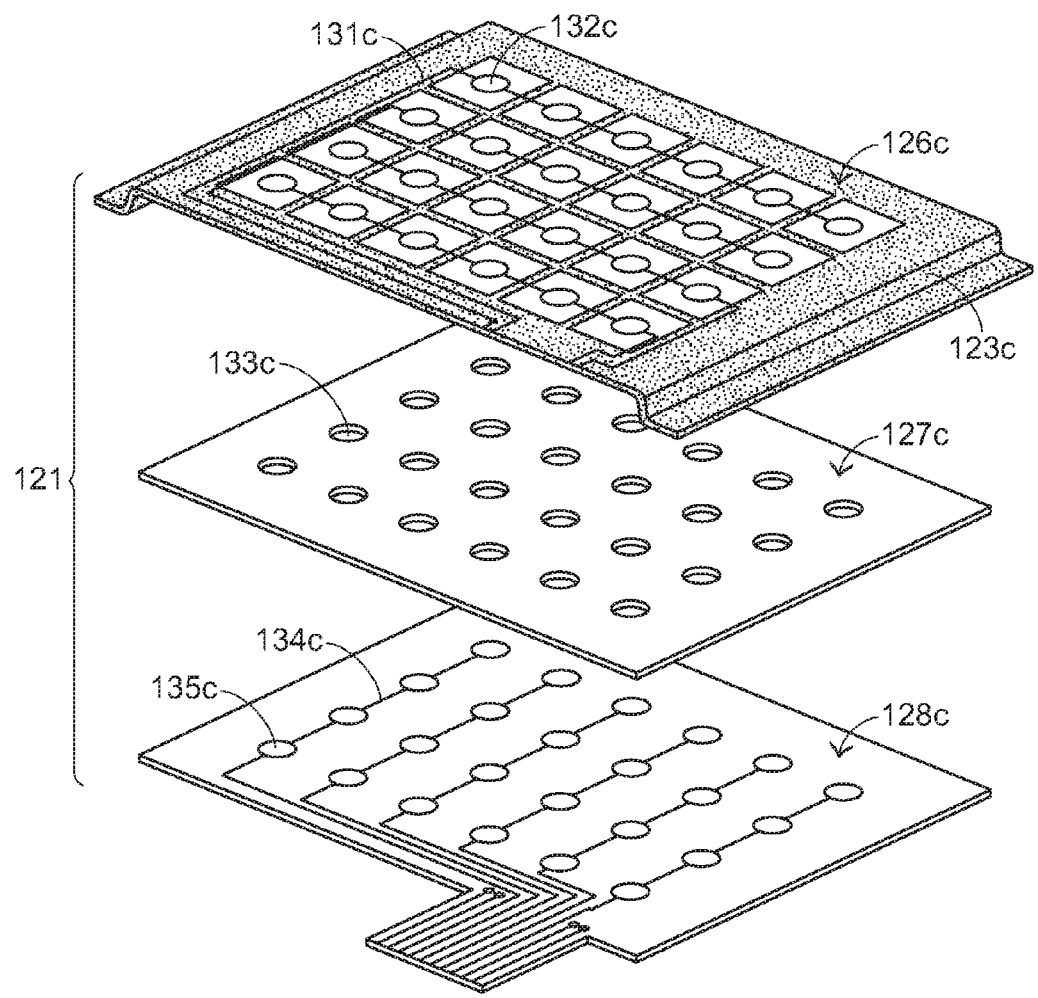

FIGS. 3A, 3B and 3C are schematic exploded views illustrating three examples of the contact type sensor board used in the illuminated keyboard of FIG. 2. That is, one of the three exemplary contact type sensor boards 121 shown in FIGS. 3A, 3B and 3C may be used in the illuminated keyboard 100 of FIG. 2. The contact type sensor board 121 comprises a first wiring plate 126, a partition plate 127, and a second wiring plate 128. In FIGS. 3A, 3B and 3C, the first wiring plates 126 are respectively denoted by numeral references 126a, 126b and 126c, the partition plates 127 are respectively denoted by numeral references 127a, 127b and 127c, and the second wiring plates 128 are respectively denoted by numeral references 128a, 128b and 128c. Moreover, the first wiring plate 126 comprises a first circuit pattern 131, and plural first contacts 132 are formed on the first circuit pattern 131. In FIGS. 3A, 3B and 3C, the first circuit patterns 131 are respectively denoted by numeral references 131a, 131b and 131c, and the first contacts 132 are respectively denoted by numeral references 132a, 132b and 132c. Moreover, the partition plate 127 comprises plural perforations 133. In FIGS. 3A, 3B and 3C, the perforations 133 are respectively denoted by numeral references 133a, 133b and 133c. Moreover, the second wiring plate 128 comprises a second circuit pattern 134, and plural second contacts 135 are formed on the second circuit pattern 134. In FIGS. 3A, 3B and 3C, the second circuit patterns 134 are respectively denoted by numeral references 134a, 134b and 134c, and the second contacts 135 are respectively denoted by numeral references 135a, 135b and 135c.

As shown in FIGS. 3A, 3B and 3C, the partition plate 127 is clamped between the second wiring plate 128 and the first wiring plate 126 collaboratively. Moreover, each of the first contacts 132 is aligned with a corresponding perforation 133 and a corresponding second contact 135. As the key structure 111 is depressed, the key structure 111 is moved downwardly. Consequently, the first contact 132 and the second contact 135 of the contact type sensor board 121 corresponding to the depressed key structure 111 are contacted with each other to trigger a key signal.

Please refer to FIGS. 3A, 3B and 3C again. The bent edge region 123 of the non-contact type sensor board 121 is one of the edge regions shown in FIGS. 3A, 3B and 3C. That is, the bent edge region 123 of the contact type sensor board 121 is the edge region 123a of the second wiring plate 128a (see FIG. 3A), the edge region 123b of the partition plate 127b (see FIG. 3B) or the edge region 123c of the first wiring plate 126c (see FIG. 3C).

Figure 4:
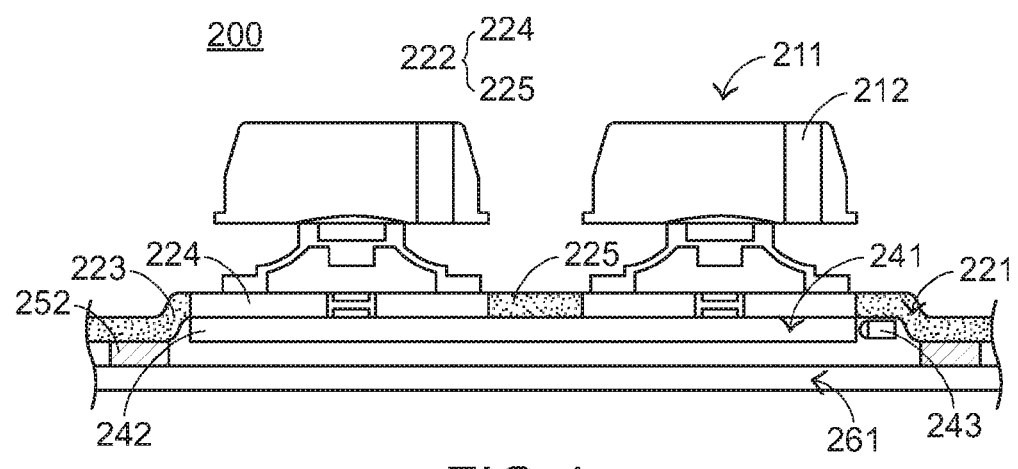
FIG. 4 is a schematic side view illustrating an illuminated keyboard according to a second embodiment of the present invention.

FIG. 4 is a schematic side view illustrating an illuminated keyboard according to a second embodiment of the present invention. As shown in FIG. 4, the illuminated keyboard 200 comprises a key structure 211, a contact type sensor board 221, a light source 243, a light guide plate 241, an adhesive layer 252, and a bottom plate 261. In the contact type sensor board 121 of the illuminated keyboard 100 of the first embodiment, the first contacts 132 and the second contacts 135 are separated from each other by the partition plate 127. Whereas, in the contact type sensor board 221 of the illuminated keyboard 200 of this embodiment, plural first contacts 232 and plural second contacts 235 are separated from each other by UV-based dot spacers 233, which are printed on a second wiring plate 228 (see FIGS. 5A and 5B). The structures and functions of other components of the illuminated keyboard 200 are similar to those of the illuminated keyboard 100 of the first embodiment, and are not redundantly described herein.

Figure 5A:
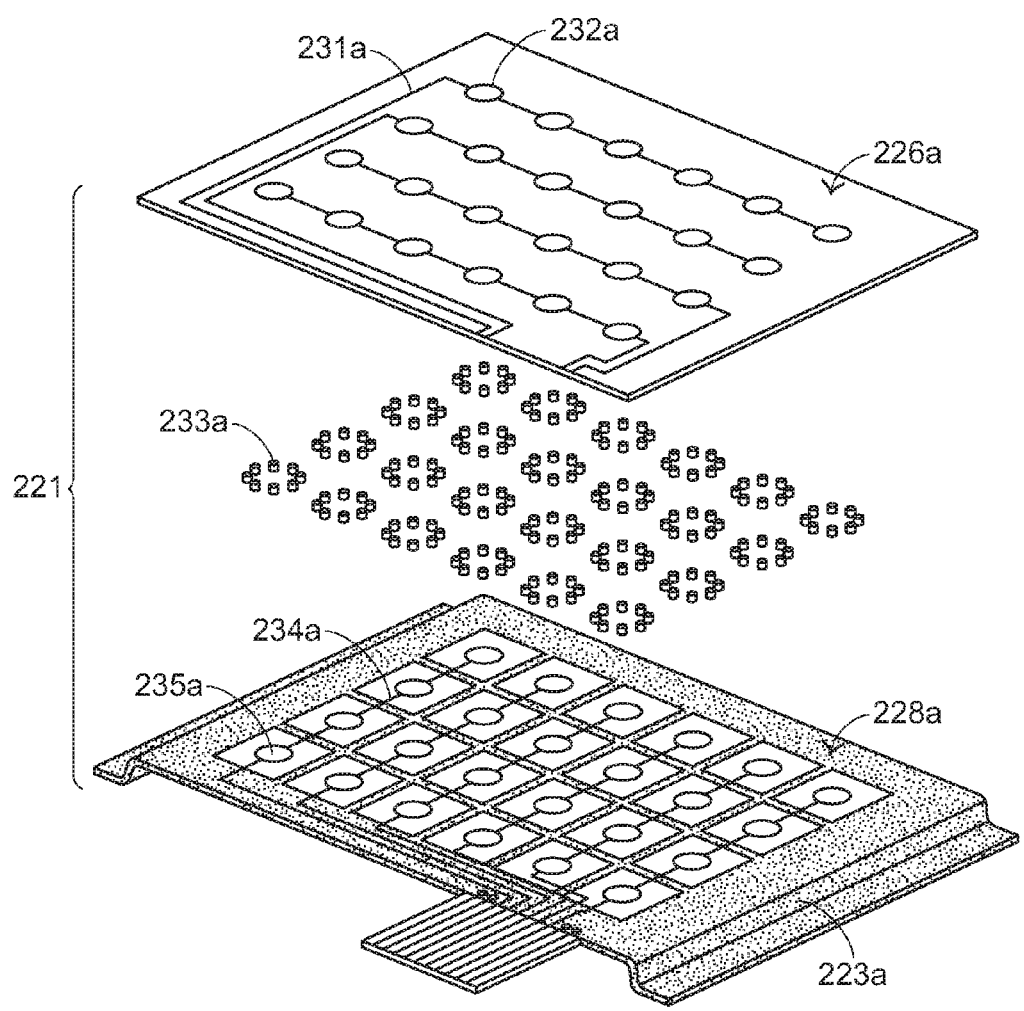
FIGS. 5A and 5B are schematic exploded views illustrating two examples of the contact type sensor board used in the illuminated keyboard of FIG. 4.
Figure 5B:
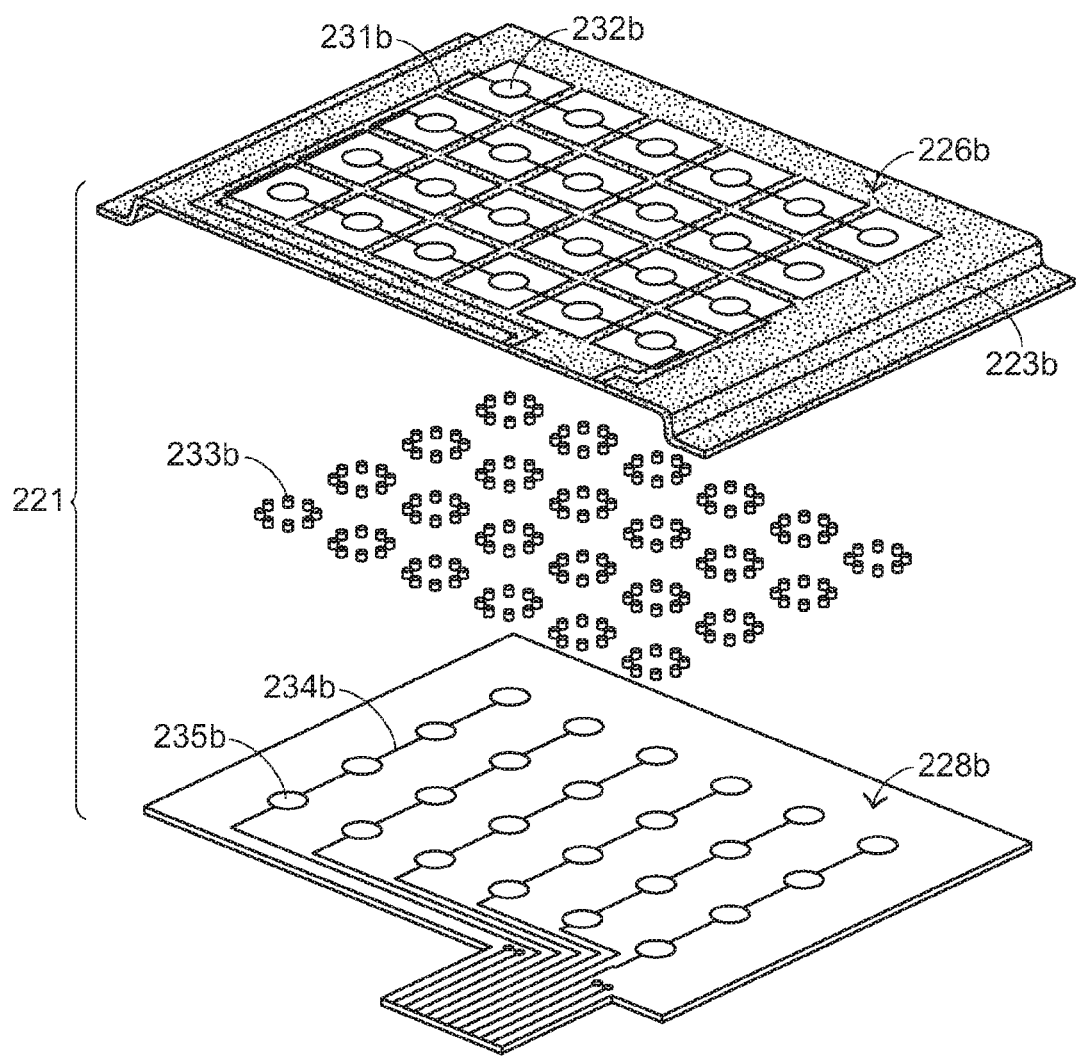

FIGS. 5A and 5B are schematic exploded views illustrating two examples of the contact type sensor board used in the illuminated keyboard of FIG. 4. That is, one of the two exemplary contact type sensor boards 221 shown in FIGS. 5A and 5B may be used in the illuminated keyboard 200 of FIG. 4. The contact type sensor board 221 comprises a first wiring plate 226 and a second wiring plate 228. In FIGS. 5A and 5B, the first wiring plates 226 are respectively denoted by numeral references 226a and 226b, and the second wiring plates 228 are respectively denoted by numeral references 228a and 228b. Moreover, the first wiring plate 226 comprises a first circuit pattern 231, and plural first contacts 232 are formed on the first circuit pattern 231. In FIGS. 5A and 5B, the first circuit patterns 231 are respectively denoted by numeral references 231a and 231b, and the first contacts 232 are respectively denoted by numeral references 232a and 232b. Moreover, the second wiring plate 228 comprises a second circuit pattern 234, and plural second contacts 235 are formed on the second circuit pattern 234. In FIGS. 5A and 5B, the second circuit patterns 234 are respectively denoted by numeral references 234a and 234b, and the second contacts 235 are respectively denoted by numeral references 235a and 235b. Moreover, plural UV-based dot spacers 233 are printed around each second contact 235. In FIGS. 5A and 5B, the UV-based dot spacers 233 are respectively denoted by numeral references 233a and 233b. In addition, the first wiring plate 226 is contacted with the plural UV-based dot spacers 233, so that a key gap is formed between each first contact and the corresponding second contact. Due to the key gap, the first contact 232 and the corresponding second contact 235 are not electrically connected with each other before the key structure 211 is depressed by the user.

Please refer to FIGS. 5A and 5B again. The bent edge region 223 of the contact type sensor board 221 is one of the edge regions shown in FIGS. 5A and 5B. That is, the bent edge region 223 of the contact type sensor board 221 is the edge region 223a of the second wiring plate 228a (see FIG. 5A) or the edge region 223b of the first wiring plate 226b (see FIG. 5B).

Figure 6:
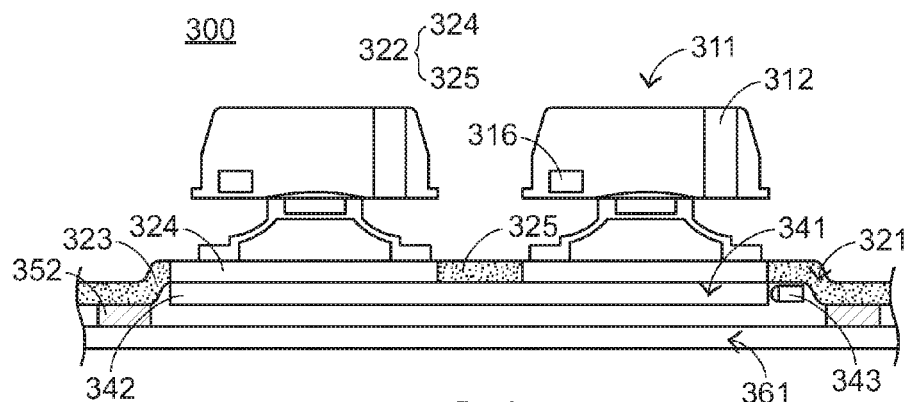
FIG. 6 is a schematic side view illustrating an illuminated keyboard according to a third embodiment of the present invention.

FIG. 6 is a schematic side view illustrating an illuminated keyboard according to a third embodiment of the present invention. As shown in FIG. 6, the illuminated keyboard 300 comprises a key structure 311, a non-contact type sensor board 321, a light source 343, a light guide plate 341, an adhesive layer 352, and a bottom plate 361. In the illuminated keyboard 100 of the first embodiment, the sensor board is the contact type sensor board 121. Whereas, in the illuminated keyboard 300 of this embodiment, the sensor board is the non-contact type sensor board 321. Moreover, the key structure 311 of the illuminated keyboard 300 further comprises a conductive element 316. For example, conductive element 316 is a conductive film layer, which is made of conductive foam or metallic paint. The structures and functions of other components of the illuminated keyboard 300 are similar to those of the illuminated keyboard 100 of the first embodiment, and are not redundantly described herein.

Figure 7A:
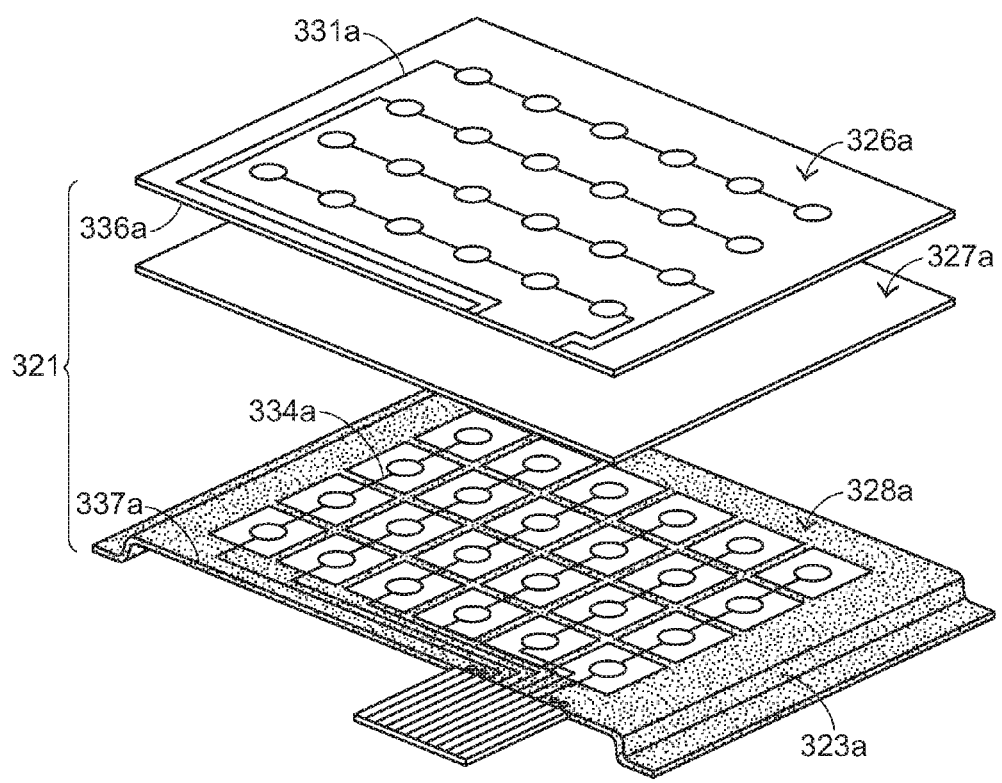
FIGS. 7A, 7B and 7C are schematic exploded views illustrating three examples of the non-contact type sensor board used in the illuminated keyboard of FIG. 6.
Figure 7B:
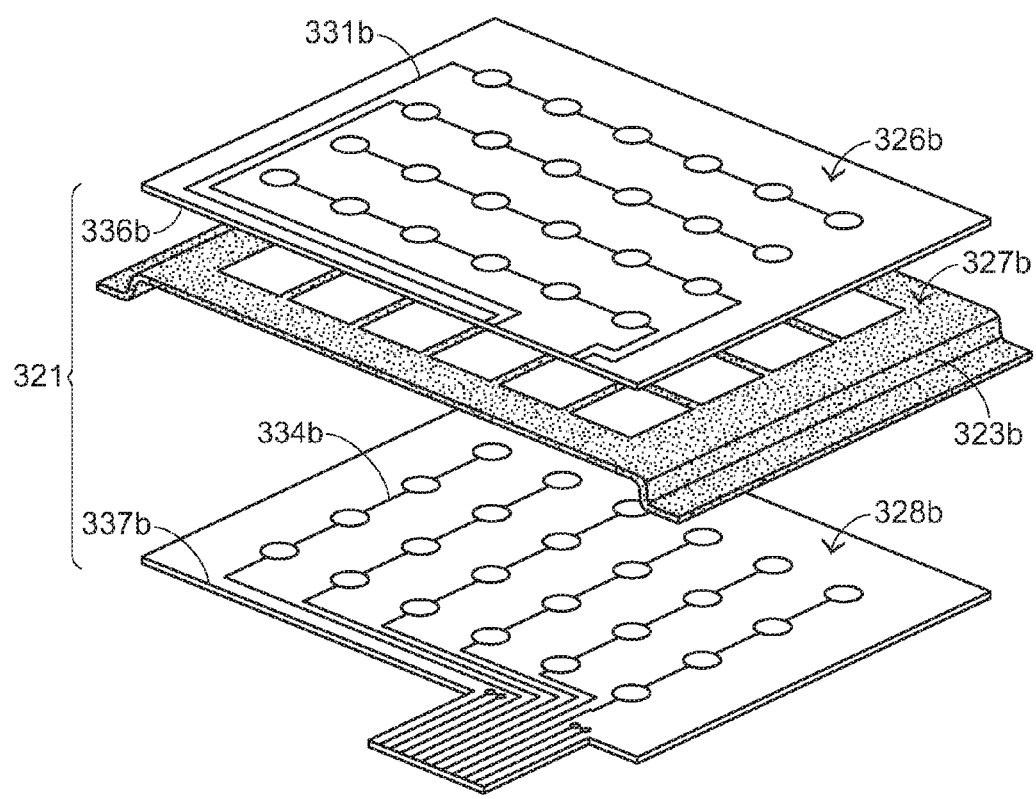
Figure 7C:
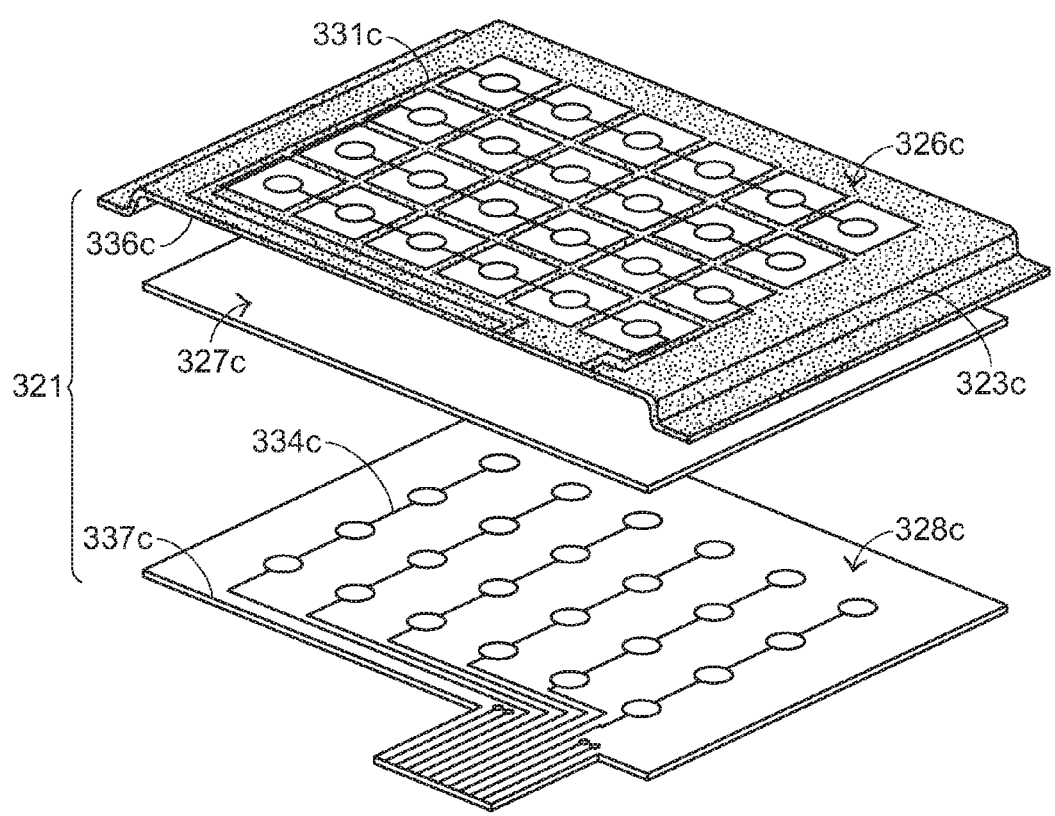

FIGS. 7A, 7B and 7C are schematic exploded views illustrating three examples of the non-contact type sensor board used in the illuminated keyboard of FIG. 6. That is, one of the three exemplary non-contact type sensor boards 321 shown in FIGS. 7A, 7B and 7C may be used in the illuminated keyboard 300 of FIG. 6. The non-contact type sensor board 321 comprises a first substrate 326, a partition plate 327, and a second substrate 328. In FIGS. 7A, 7B and 7C, the first substrates 326 are respectively denoted by numeral references 326a, 326b and 326c, the partition plates 327 are respectively denoted by numeral references 327a, 327b and 327c, and the second substrates 328 are respectively denoted by numeral references 328a, 328b and 328c. The partition plate 327 is arranged between the first substrate 326 and the second substrate 328. Moreover, the first substrate 326 comprises a first electrode pattern 331, and the first electrode pattern 331 is formed on a first surface 336 of the first substrate 326. In FIGS. 7A, 7B and 7C, the first electrode patterns 331 are respectively denoted by numeral references 331a, 331b and 331c, and the first surfaces 336 of the first substrates 326 are respectively denoted by numeral references 336a, 336b and 336c. Moreover, the second substrate 328 comprises a second electrode pattern 334, and the second electrode pattern 334 is formed on a second surface 337 of the second substrate 328. In FIGS. 7A, 7B and 7C, the second electrode patterns 334 are respectively denoted by numeral references 334a, 334b and 334c, and the second surfaces 337 of the second substrates 328 are respectively denoted by numeral references 337a, 337b and 337c. Please refer to FIGS. 6, 7A, 7B and 7C. The first electrode pattern 331 contains positive charges, and the second electrode pattern 334 contains negative charges. The first electrode pattern 331 and the second electrode pattern 334 are collaboratively defined as a parallel-plate capacitor. As known, the human fingers are electrically conductive. When the key structure 311 is depressed by the user's finger, the magnitude of the electric field between the first electrode pattern 331 and the second electrode pattern 334 is influenced by the user's finger. Consequently, the non-contact type sensor board 321 generates a key signal. Moreover, the conductive element 316 on the key structure 311 may increase the change amount of the electric field in response to the depressing action of the key structure 311. Consequently, the depressing action of the key structure 311 by the user can be detected by the non-contact type sensor board 321 in a more sensitive manner.

Please refer to FIGS. 7A, 7B and 7C again. The bent edge region 323 of the non-contact type sensor board 321 is one of the edge regions shown in FIGS. 7A, 7B and 7C. That is, the bent edge region 323 of the non-contact type sensor board 321 is the edge region 323a of the second substrate 328a (see FIG. 7A), the edge region 323b of the partition plate 327b (see FIG. 7B) or the edge region 323c of the first substrate 326c (see FIG. 7C).

Figure 8:
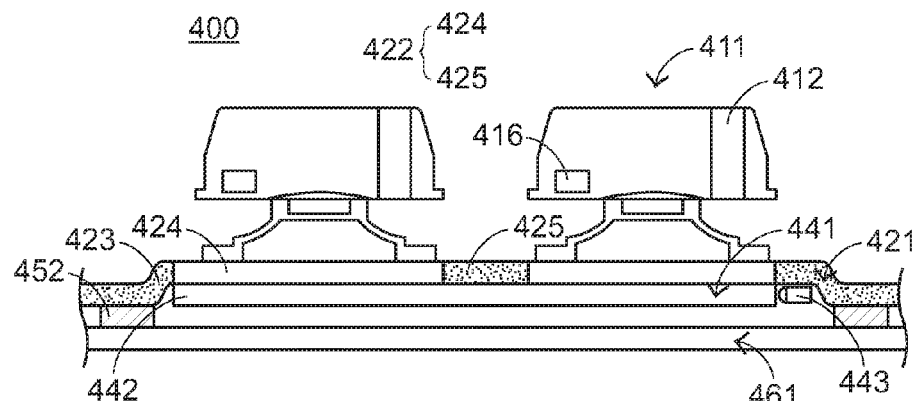
FIG. 8 is a schematic side view illustrating an illuminated keyboard according to a fourth embodiment of the present invention.

FIG. 8 is a schematic side view illustrating an illuminated keyboard according to a fourth embodiment of the present invention. As shown in FIG. 8, the illuminated keyboard 400 comprises a key structure 411, a non-contact type sensor board 421, a light source 443, a light guide plate 441, an adhesive layer 452, and a bottom plate 461. In this embodiment, the non-contact type sensor board 421 of the illuminated keyboard 400 has a double-layered structure. That is, the partition plate is not included in the non-contact type sensor board 421, but a spacer layer is printed on a first substrate or a second substrate. The spacer layer is not an independent plate. That is, the spacer layer is a layer of insulating material printed on the first substrate or the second substrate. Due to the spacer layer, the electrode layers on the first substrate and the second substrate are not electrically connected with each other before the key structure 411 is depressed by the user. The structures and functions of other components of the illuminated keyboard 400 are similar to those of the illuminated keyboard 300 of the third embodiment, and are not redundantly described herein.

Figure 9A:
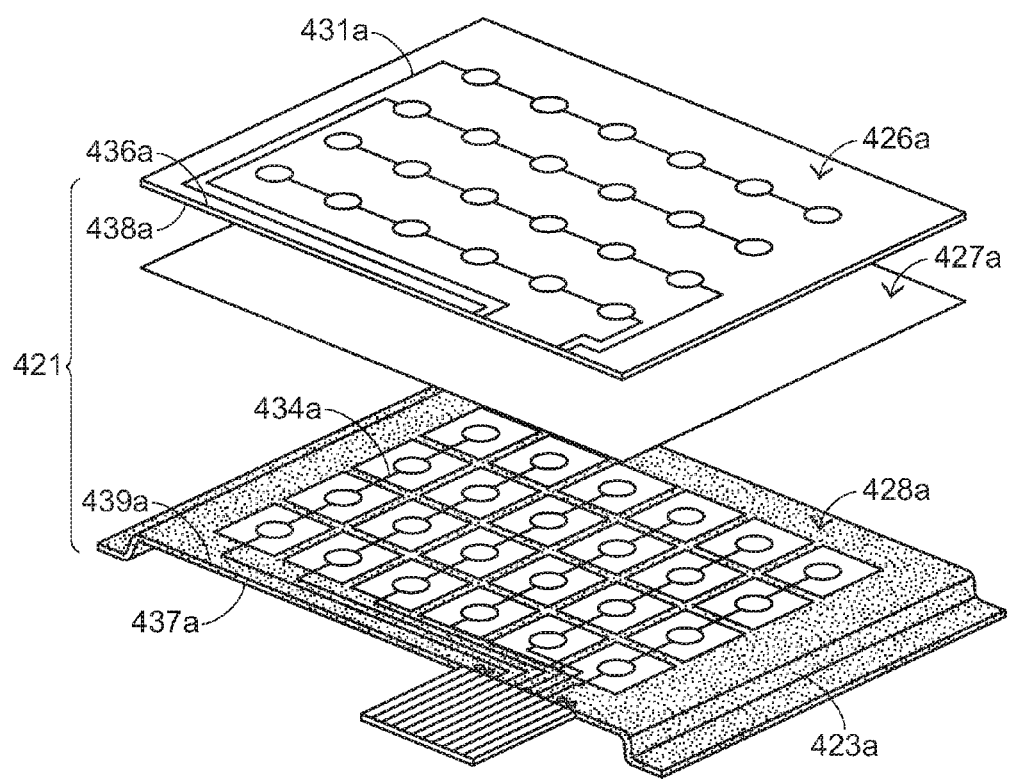
FIGS. 9A and 9B are schematic exploded views illustrating two examples of the non-contact type sensor board used in the illuminated keyboard of FIG. 8.
Figure 9B:
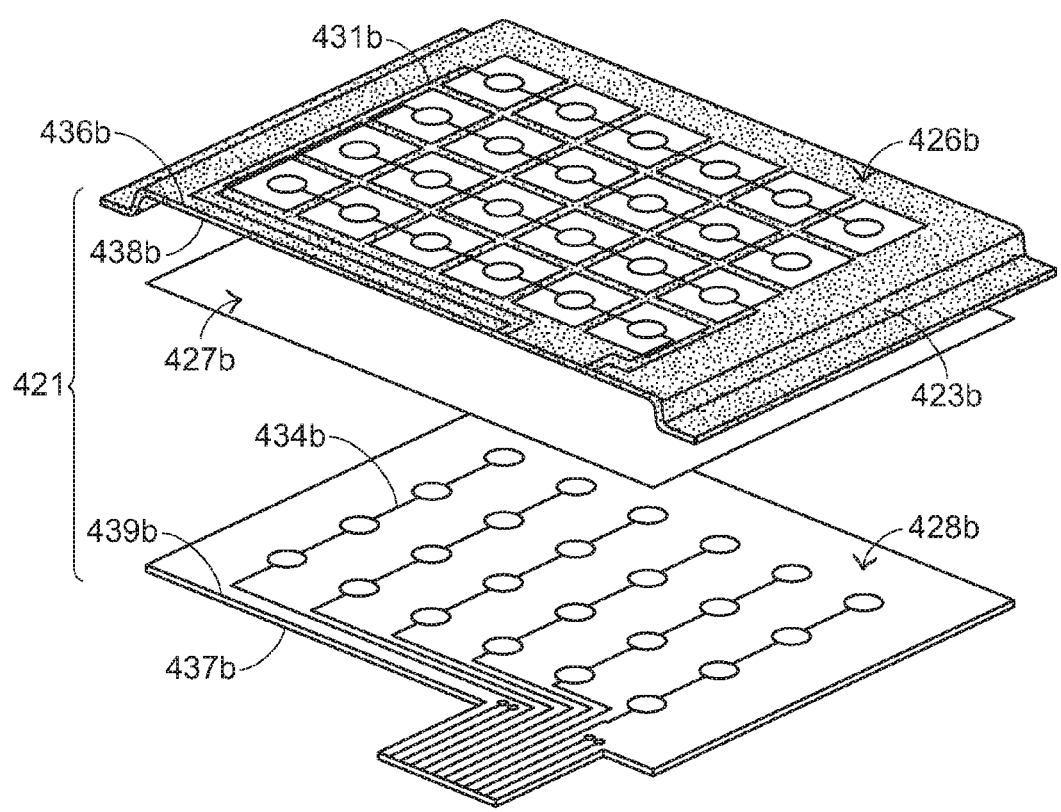

FIGS. 9A and 9B are schematic exploded views illustrating two examples of the non-contact type sensor board used in the illuminated keyboard of FIG. 8. That is, one of the two exemplary non-contact type sensor boards 421 shown in FIGS. 9A and 9B may be used in the illuminated keyboard 400 of FIG. 8. The non-contact type sensor board 421 comprises a first substrate 426, a second substrate 428, and a spacer layer 427. In FIGS. 9A and 9B, the first substrates 426 are respectively denoted by numeral references 426a and 426b, the second substrates 428 are respectively denoted by numeral references 428a and 428b, and the spacer layers 427 are respectively denoted by numeral references 427a and 427b. Moreover, the first substrate 426 comprises a first electrode pattern 431, and the first electrode pattern 431 is formed on a first surface 436 of the first substrate 426. In FIGS. 9A and 9B, the first electrode patterns 431 are respectively denoted by numeral references 431a and 431b, and the first surfaces 436 of the first substrates 426 are respectively denoted by numeral references 436a and 436b. Moreover, the second substrate 428 comprises a second electrode pattern 434, and the second electrode pattern 434 is formed on a second surface 437 of the second substrate 428. In FIGS. 9A and 9B, the second electrode patterns 434 are respectively denoted by numeral references 434a and 434b, and the second surfaces 437 of the second substrates 428 are respectively denoted by numeral references 437a and 437b. The spacer layer 427 is arranged between the first substrate 426 and the second substrate 428. For example, the spacer layer 427 is printed on a bottom surface 438 of the first substrate 426 or printed on a top surface 439 of the second substrate 428. In FIGS. 9A and 9B, the bottom surfaces 438 of the first substrates 426 are respectively denoted by numeral references 438a and 438b, and the top surfaces 439 of the second substrates 428 are respectively denoted by numeral references 439a and 439b.

Please refer to FIGS. 9A and 9B again. The bent edge region 423 of the non-contact type sensor board 421 is one of the edge regions shown in FIGS. 9A and 9B. That is, the bent edge region 423 of the non-contact type sensor board 421 is the edge region 423a of the second substrate 428a (see FIG. 9A) or the edge region 423b of the first substrate 426b (see FIG. 9B).

Figure 10:
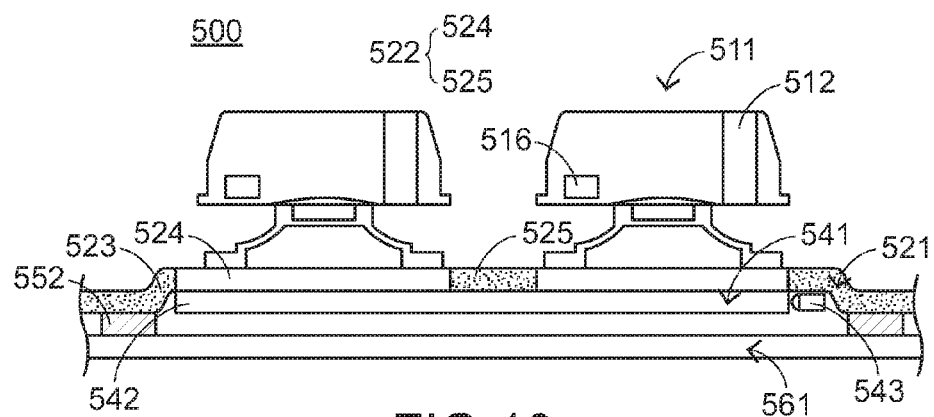
FIG. 10 is a schematic side view illustrating an illuminated keyboard according to a fifth embodiment of the present invention.

FIG. 10 is a schematic side view illustrating an illuminated keyboard according to a fifth embodiment of the present invention. As shown in FIG. 10, the illuminated keyboard 500 comprises a key structure 511, a non-contact type sensor board 521, a light source 543, a light guide plate 541, an adhesive layer 552, and a bottom plate 561. In this embodiment, the non-contact type sensor board 521 of the illuminated keyboard 500 is a laminate structure. That is, a first electrode pattern, a second electrode layer and a spacer layer are printed on a single substrate. The structures and functions of other components of the illuminated keyboard 500 are similar to those of the illuminated keyboard 400 of the fourth embodiment, and are not redundantly described herein.

Figure 11:
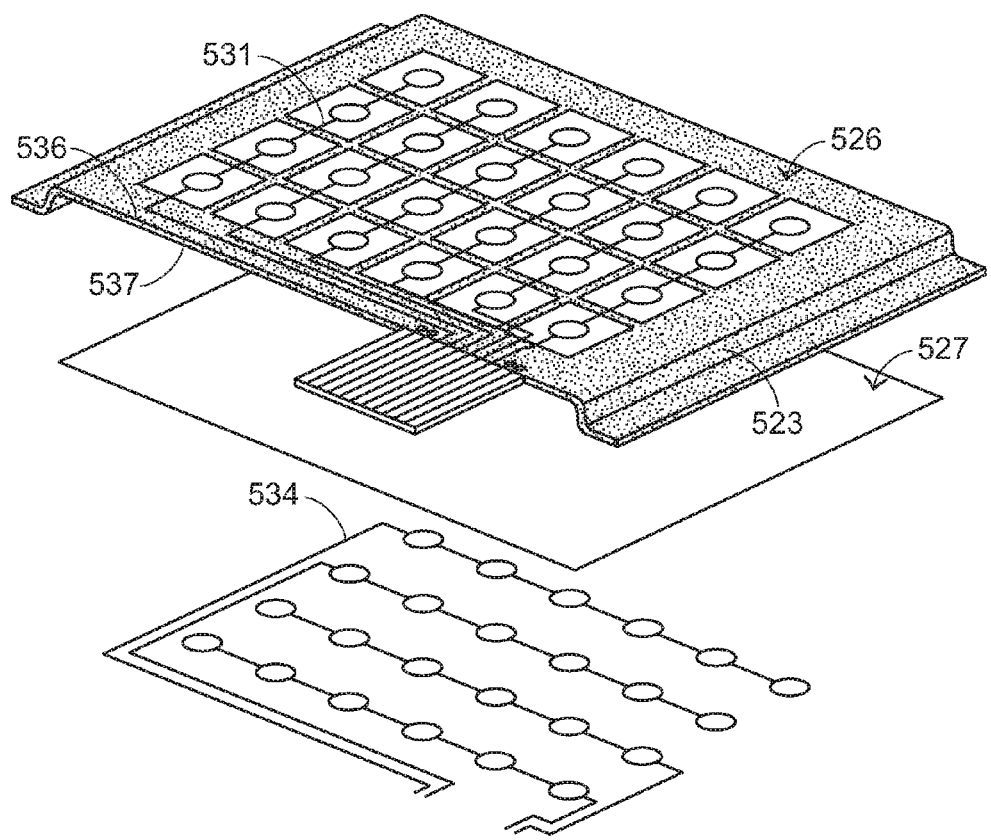
FIG. 11 is a schematic exploded view illustrating the non-contact type sensor board used in the illuminated keyboard of FIG. 10.

FIG. 11 is a schematic exploded view illustrating the non-contact type sensor board used in the illuminated keyboard of FIG. 10. As shown in FIG. 11, the non-contact type sensor board 521 comprises a substrate 526. A first electrode layer 531, a spacer layer 527 and a second electrode layer 534 are sequentially printed on the substrate 526. The first electrode layer 531, the spacer layer 527 and the second electrode layer 534 may be all printed on a first surface 536 of the substrate 526. Alternatively, as shown in FIG. 11, the first electrode layer 531 is printed on the first surface 536 of the substrate 526, and the spacer layer 527 and the second electrode layer 534 are sequentially printed on a second surface 537 of the substrate 526. Please refer to FIGS. 10 and 11 again. At least one edge region 523 of the substrate 526 of the non-contact type sensor board 521 is bent to enclose at least one edge region 542 of the light guide plate 541 in order to prevent lateral light leakage of the illuminated keyboard 500.

Figure 12:
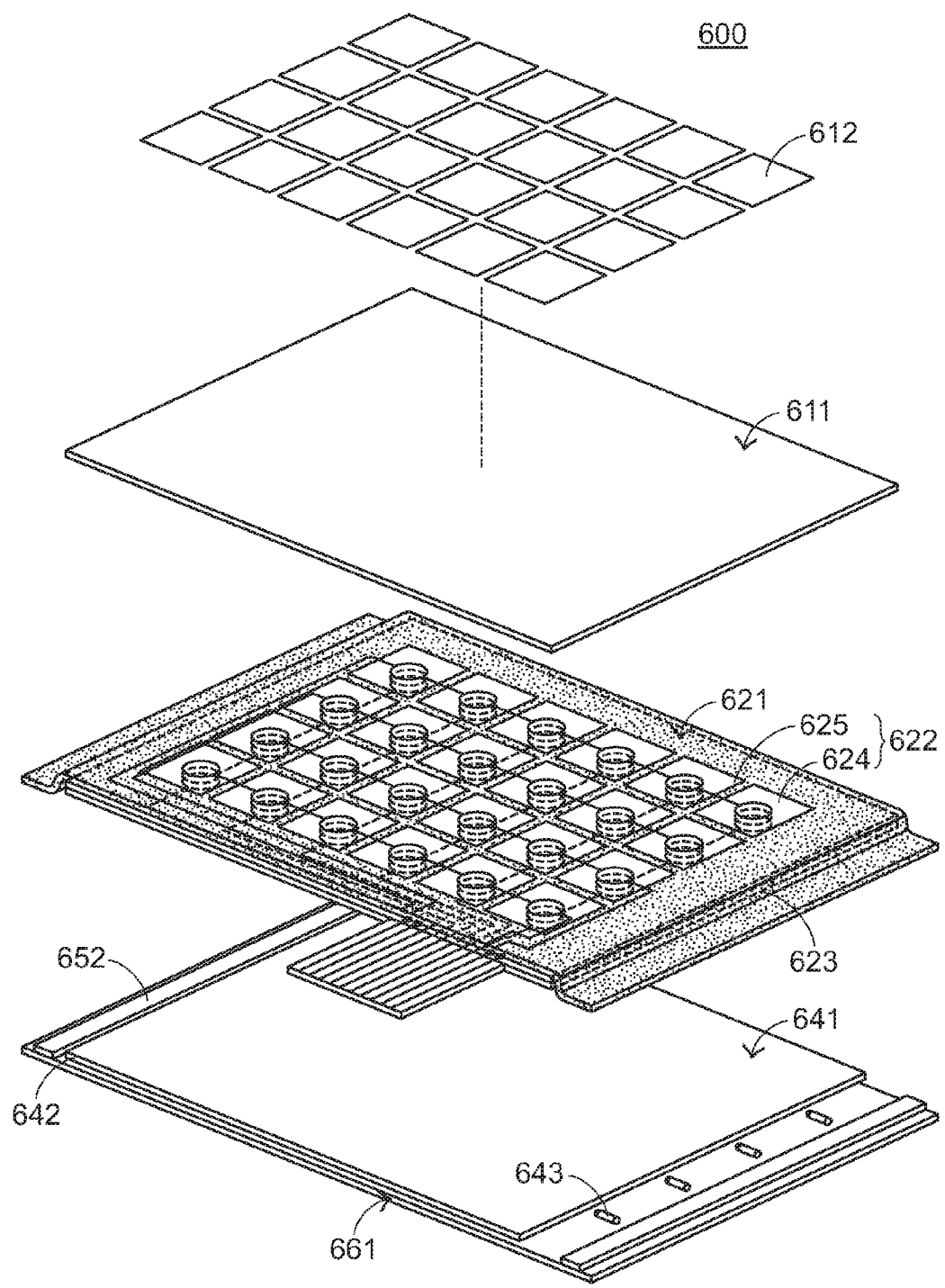
FIG. 12 is a schematic side view illustrating an illuminated keyboard according to a sixth embodiment of the present invention.

FIG. 12 is a schematic side view illustrating an illuminated keyboard according to a sixth embodiment of the present invention. As shown in FIG. 12, the illuminated keyboard 600 comprises a patterning substrate 611, a sensor board 621, a light source 643, a light guide plate 641, an adhesive layer 652, and a bottom plate 661. Moreover, plural key patterns 612 are printed on the patterning substrate 611 to be identified and touched by the user. Consequently, a key signal is correspondingly triggered. The sensor board 621 comprises a key wiring region 622 for sensing a touching action of the user and thereby generates the key signal. In this embodiment, the key wiring region 622 is divided into a key triggering sub-region 624 and a key spacing sub-region 625 which is outside the key triggering sub-region 624. The light source 643 is used for emitting a light beam to the light guide plate 641.

Please refer to FIG. 12 again. The sensor board 621 is made of a light-transmissible material. The sensor board 621 is disposed over the light guide plate 641. Moreover, at least one edge region 623 of the sensor board 621 is coated with a light-shading material or mixed with the light-shading material. In addition, the at least one edge region 623 of the sensor board 621 is bent to enclose at least one edge 642 of the light guide plate 641 in order to prevent lateral light leakage of the illuminated keyboard 600. Please refer to FIG. 12 again. The key spacing sub-region 625 of the sensor board 621 is also coated with the light-shading material or mixed with the light-shading material in order to prevent the light beam from being leaked out through the vacant space between every two adjacent key patterns 612. In other words, the light beam fails to be leaked out through a lateral side of the illuminated keyboard 600, and the light beam also fails to be leaked out through the vacant space between every two adjacent key patterns 612. Under this circumstance, the quality and texture of the overall illuminated keyboard 600 will be enhanced. The sensor board 621 may be a contact type sensor board or a non-contact type sensor board. Moreover, the sensor board 621 has a single-layered structure or a double-layered structure. Alternatively, as shown in FIG. 12, the sensor board 621 has a triple-layered structure. Moreover, the adhesive layer 652 is used for allowing the bent edge region 623 of the sensor board 621 to be adhered onto the bottom plate 661.

Figure 13:
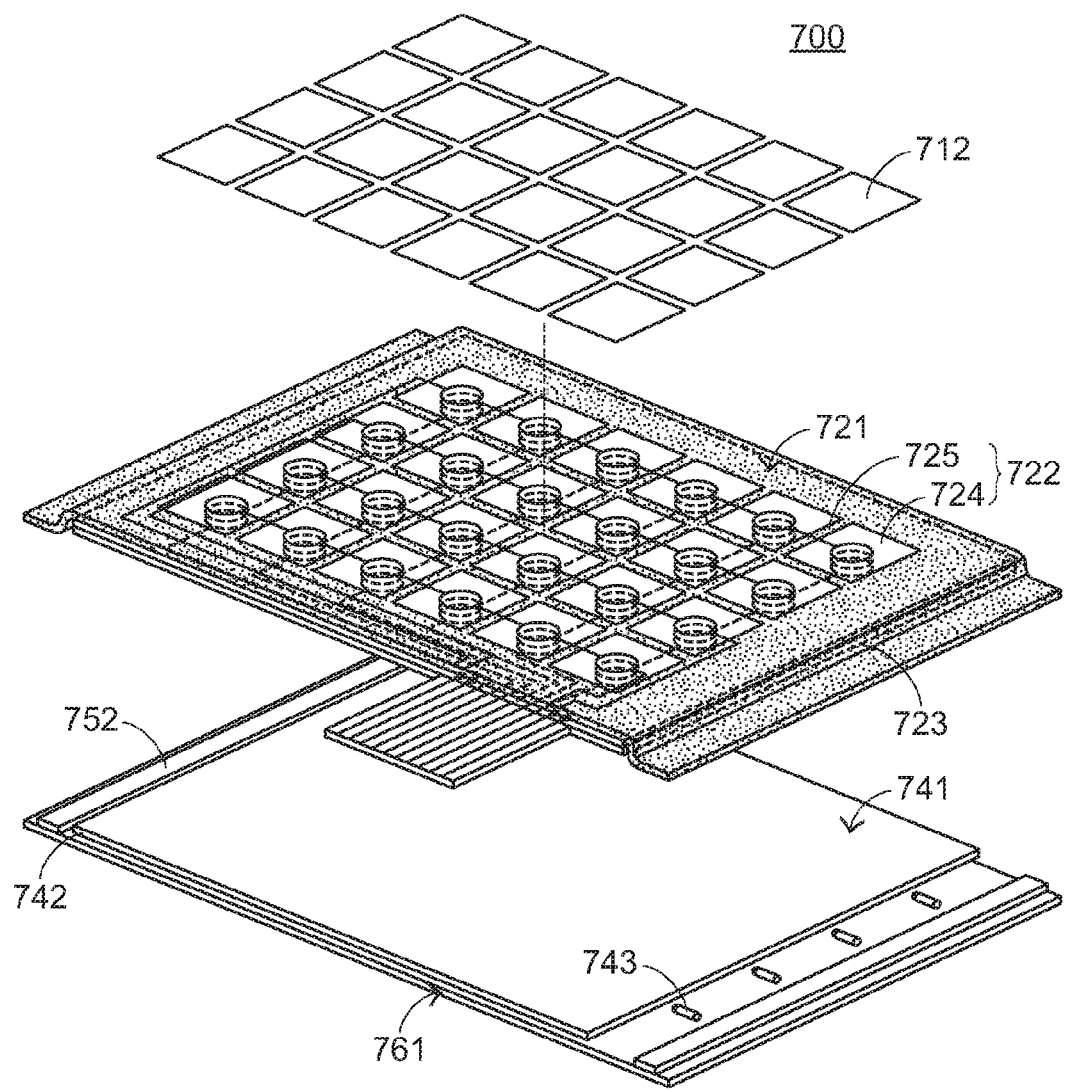
FIG. 13 is a schematic side view illustrating an illuminated keyboard according to a seventh embodiment of the present invention.

FIG. 13 is a schematic side view illustrating an illuminated keyboard according to a seventh embodiment of the present invention. As shown in FIG. 13, the illuminated keyboard 700 comprises a sensor board 721, a light source 743, a light guide plate 741, an adhesive layer 752, and a bottom plate 761. The sensor board 721 comprises a key wiring region 722 for sensing a touching action of the user and thereby generates a corresponding key signal. In this embodiment, the key wiring region 722 is divided into a key triggering sub-region 724 and a key spacing sub-region 725 which is outside the key triggering sub-region 724. Moreover, plural key patterns 712 are printed on the sensor board 721 to be identified and touched by the user. Consequently, a key signal is correspondingly triggered. In the illuminated keyboard 700 of this embodiment, the key patterns 712 are printed on the sensor board 721 rather than the patterning substrate. The structures and functions of other components of the illuminated keyboard 700 are similar to those of the illuminated keyboard 600 of the sixth embodiment, and are not redundantly described herein.

Please refer to FIG. 13 again. The sensor board 721 is made of a light-transmissible material. The sensor board 721 is disposed over the light guide plate 741. Moreover, the at least one edge region 723 of the sensor board 721 is coated with a light-shading material or mixed with the light-shading material. In addition, the at least one edge region 723 of the sensor board 721 is bent to enclose at least one edge region 742 of the light guide plate 741 in order to prevent lateral light leakage of the illuminated keyboard 700. Moreover, the key spacing sub-region 725 of the sensor board 721 is also coated with the light-shading material or mixed with the light-shading material in order to prevent the light beam from being leaked out through the vacant space between every two adjacent key patterns 712. In other words, the light beam fails to be leaked out through a lateral side of the illuminated keyboard 700, and the light beam also fails to be leaked out through the vacant space between every two adjacent key patterns 712. Under this circumstance, the quality and texture of the overall illuminated keyboard 700 will be enhanced.

Figure 14:
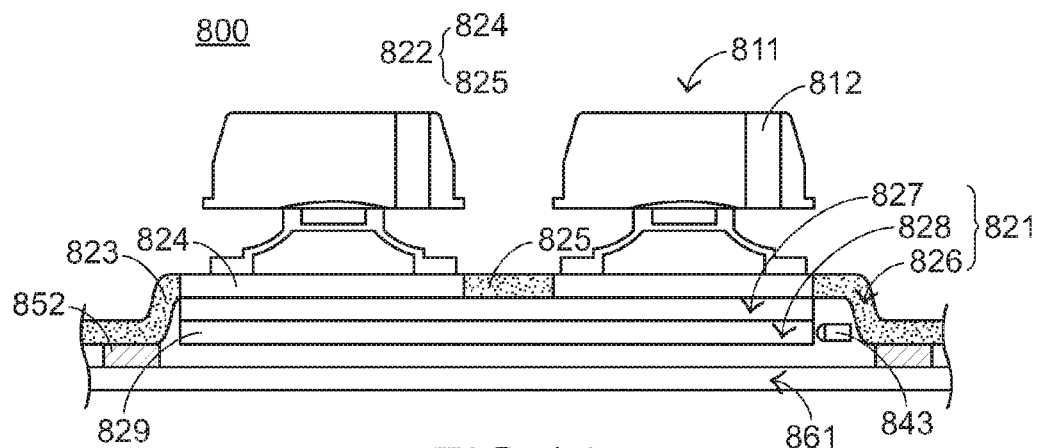
FIG. 14 is a schematic side view illustrating an illuminated keyboard according to an eighth embodiment of the present invention.

FIG. 14 is a schematic side view illustrating an illuminated keyboard according to an eighth embodiment of the present invention. As shown in FIG. 14, the illuminated keyboard 800 comprises a key structure 811, a sensor board 821, a light source 843, an adhesive layer 852, and a bottom plate 861. In this embodiment, the sensor board 821 comprises a first substrate 826, a partition plate 827, and a second substrate 828. A first circuit pattern (not shown) is printed on the first substrate 826, and a second circuit pattern (not shown) is printed on the second substrate 828. The sensor board 821 is used for sensing a touching action of the user and thereby generates a corresponding key signal. The sensor board 821 may be a contact type sensor board or a non-contact type sensor board. In addition, the second substrate 828 of the sensor board 821 has a light-guiding function. The light beam 843 is used for emitting a light beam to the second substrate 828.

Please refer to FIG. 14 again. The sensor board 821 comprises a key wiring region 822. The key wiring region 822 is divided into a key triggering sub-region 824 corresponding to the key structure 811 and a key spacing sub-region 825 which is outside the key triggering sub-region 824. Each of the first substrate 826 and the partition plate 827 is made of a light-guiding material. Moreover, at least one edge region 823 of the first substrate 826 is coated with a light-shading material or mixed with the light-shading material. In addition, the at least one edge region 823 of the first substrate 826 is bent to enclose at least one edge 829 of the second substrate 828 in order to prevent lateral light leakage of the illuminated keyboard 800. Please refer to FIG. 14 again. A portion of the first substrate 826 corresponding to the key spacing sub-region 825 is also coated with the light-shading material or mixed with the light-shading material in order to prevent the light beam from being leaked out upwardly through the vacant space between every two adjacent key structures 811. Moreover, the adhesive layer 852 is used for allowing the bent edge region 823 of the first substrate 826 to be adhered onto the bottom plate 861.

Figure 15:
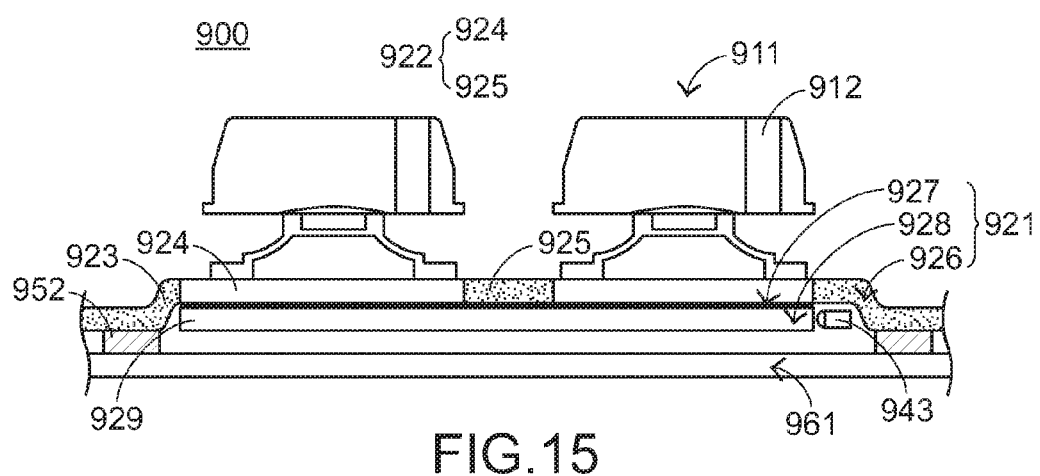
FIG. 15 is a schematic side view illustrating an illuminated keyboard according to a ninth embodiment of the present invention.

FIG. 15 is a schematic side view illustrating an illuminated keyboard according to a ninth embodiment of the present invention. As shown in FIG. 15, the illuminated keyboard 900 comprises a key structure 911, a non-contact type sensor board 921, a light source 943, an adhesive layer 952, and a bottom plate 961. In this embodiment, the non-contact type sensor board 921 comprises a first substrate 926, a spacer layer 927, and a second substrate 928. The second substrate 928 is made of a light-guiding material. A first circuit pattern (not shown) is printed on the first substrate 926, and a second circuit pattern (not shown) is printed on the second substrate 928. In comparison with the illuminated keyboard 800 of the eighth embodiment, the non-contact type sensor board 921 of the illuminated keyboard 900 of this embodiment does not comprise the partition plate. Whereas, the spacer layer 927 is printed on a surface of the first substrate 926 or a surface of the second substrate 928 for separating the first circuit pattern from the second circuit pattern. The structures and functions of other components of the illuminated keyboard 900 are similar to those of the illuminated keyboard 800 of the eighth embodiment, and are not redundantly described herein.

Figure 16:
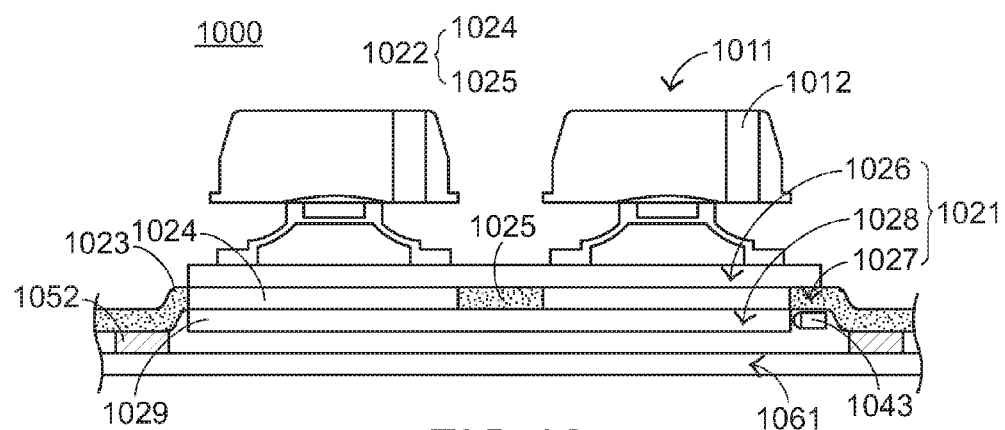
FIG. 16 is a schematic side view illustrating an illuminated keyboard according to a tenth embodiment of the present invention.

FIG. 16 is a schematic side view illustrating an illuminated keyboard according to a tenth embodiment of the present invention. As shown in FIG. 16, the illuminated keyboard 1000 comprises a key structure 1011, a sensor board 1021, a light source 1043, an adhesive layer 1052, and a bottom plate 1061. In this embodiment, the sensor board 1021 comprises a first substrate 1026, a partition plate 1027, and a second substrate 1028. A first circuit pattern (not shown) is printed on the first substrate 1026, and a second circuit pattern (not shown) is printed on the second substrate

1028. The sensor board 1021 is used for sensing a touching action of the user and thereby generates a corresponding key signal. The sensor board 1021 may be a contact type sensor board or a non-contact type sensor board. In addition, the second substrate 1028 of the sensor board 1021 has a light-guiding function. The light beam 1043 is used for emitting a light beam to the second substrate 1028.

Please refer to FIG. 16 again. The sensor board 1021 comprises a key wiring region 1022. The key wiring region 1022 is divided into a key triggering sub-region 1024 corresponding to the key structure 1011 and a key spacing sub-region 1025 which is outside the key triggering sub-region 1024. Each of the first substrate 1026 and the partition plate 1027 is made of a light-guiding material. Moreover, at least one edge region 1023 of the partition plate 1027 is coated with a light-shading material or mixed with the light-shading material. In addition, the at least one edge region 1023 of the partition plate 1027 is bent to enclose at least one edge 1029 of the second substrate 1028 in order to prevent lateral light leakage of the illuminated keyboard 1000. Please refer to FIG. 16 again. A portion of the partition plate 1027 corresponding to the key spacing sub-region 1025 is also coated with the light-shading material or mixed with the light-shading material in order to prevent the light beam from being leaked out upwardly through the vacant space between every two adjacent key structures 1011. Moreover, the adhesive layer 1052 is used for allowing the bent edge region 1023 of the partition plate 1027 to be adhered onto the bottom plate 1061.

Figure 17:
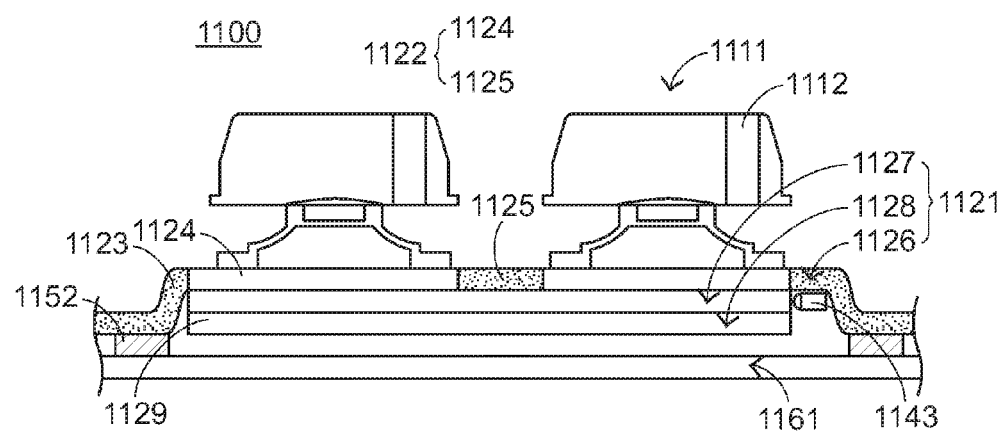
FIG. 17 is a schematic side view illustrating an illuminated keyboard according to an eleventh embodiment of the present invention.

FIG. 17 is a schematic side view illustrating an illuminated keyboard according to an eleventh embodiment of the present invention. As shown in FIG. 17, the illuminated keyboard 1100 comprises a key structure 1111, a sensor board 1121, a light source 1143, an adhesive layer 1152, and a bottom plate 1161. In this embodiment, the sensor board 1121 comprises a first substrate 1126, a partition plate 1127, and a second substrate 1128. A first circuit pattern (not shown) is printed on the first substrate 1126, and a second circuit pattern (not shown) is printed on the second substrate 1128. The sensor board 1121 is used for sensing a touching action of the user and thereby generates a corresponding key signal. The sensor board 1121 may be a contact type sensor board or a non-contact type sensor board. In addition, the partition plate 1127 of the sensor board 1121 has a light-guiding function. The light beam 1143 is used for emitting a light beam to the partition plate 1127.

Please refer to FIG. 17 again. The sensor board 1121 comprises a key wiring region 1122. The key wiring region 1122 is divided into a key triggering sub-region 1124 corresponding to the key structure 1111 and a key spacing sub-region 1125 which is outside the key triggering sub-region 1124. The first substrate 1126 is made of a light-guiding material. Moreover, at least one edge region 1123 of the first substrate 1126 is coated with a light-shading material or mixed with the light-shading material. In addition, the at least one edge region 1123 of the first substrate 1126 is bent to enclose at least one edge 1129 of the partition plate 1127 in order to prevent lateral light leakage of the illuminated keyboard 1100. Please refer to FIG. 17 again. A portion of the first substrate 1126 corresponding to the key spacing sub-region 1125 is also coated with the light-shading material or mixed with the light-shading material in order to prevent the light beam from being leaked out upwardly through the vacant space between every two adjacent key structures 1111. Moreover, the adhesive layer 1152 is used for allowing the bent edge region 1123 of the first substrate 1126 to be adhered onto the bottom plate 1161.

In the above embodiments, the key structure may comprise a keycap, a key base, and an elastic element. The keycap comprises a pressing part and a plunger part. The plunger part is disposed on the key base. The elastic element is used for restoring the keycap to its original position. Alternatively, in some other embodiments, the key structure may comprise a keycap, a scissors-type supporting structure, an elastic element. The scissors-type supporting structure is used for supporting the keycap. The elastic element is used for restoring the keycap to its original position. The key structure is presented herein for purpose of illustration and description only, but is not limited thereto. Moreover, a reflecting plate or a reflective layer may be optionally disposed under the light guide plate or the substrate with the light-guiding function in order to reflect the light beam. Consequently, the utilization efficacy of the light beam is enhanced. Moreover, in the above drawings, the edge region of the sensor board is bent downwardly to enclose the light guide plate. It is noted that numerous modifications and alterations may be made while retaining the teachings of the invention. For example, in some embodiments, the edge region of the sensor board may be bent upwardly to enclose the light guide plate.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An illuminated keyboard, comprising:
a key structure, wherein when said key structure is depressed, a key signal is correspondingly triggered;
a sensor board comprising a key wiring region for sensing a depressing action of said key structure and thereby generates said key signal;
a light source for emitting a light beam; and
a light guide plate located at a side of said light source for transferring said light beam,
wherein at least one edge region of said sensor board is bent to enclose at least one edge region of said light guide plate and thereby prevents lateral light leakage of said illuminated keyboard.

2. The illuminated keyboard according to claim 1, wherein said bent edge region of said sensor board is coated with a light-shading material or mixed with said light-shading material.

3. The illuminated keyboard according to claim 1, wherein said sensor board is disposed over said light guide plate, and said key wiring region is divided into a key triggering sub-region and a key spacing sub-region, wherein said key spacing sub-region is coated with a light-shading material or mixed with said light-shading material and thereby said light beam is prevented from being leaked out through a lateral side of said key structure.

4. The illuminated keyboard according to claim 1, wherein said illuminated keyboard further comprises:
a bottom plate disposed under said light guide plate and said sensor board for supporting said light guide plate and said sensor board; and
an adhesive layer for allowing said bent edge region of said sensor board to be adhered onto said bottom plate.

5. The illuminated keyboard according to claim 1, wherein said sensor board is made of a light-transmissible material.

6. The illuminated keyboard according to claim 1, wherein said sensor board is a non-contact type sensor board.

7. The illuminated keyboard according to claim 6, wherein said non-contact type sensor board comprises:
- a substrate comprising a first surface and a second surface;
- a first electrode pattern disposed on said first surface of said substrate;
- a second electrode pattern disposed on said first surface or said second surface of said substrate; and
- a spacer layer arranged between said first electrode pattern and said second electrode pattern.

8. The illuminated keyboard according to claim 6, wherein said non-contact type sensor board comprises:
- a first substrate comprising a first electrode pattern, wherein said first electrode pattern is disposed on a first surface of said first substrate;
- a second substrate comprising a second electrode pattern, wherein said second electrode pattern is disposed on a second surface of said second substrate; and
- a spacer layer arranged between said first electrode pattern and said second electrode pattern.

9. The illuminated keyboard according to claim 6, wherein said non-contact type sensor board comprises:
- a first substrate comprising a first electrode pattern, wherein said first electrode pattern is disposed on a first surface of said first substrate;
- a second substrate comprising a second electrode pattern, wherein said second electrode pattern is disposed on a second surface of said second substrate; and
- a partition plate arranged between said first substrate and said second substrate.

10. The illuminated keyboard according to claim 1, wherein said sensor board is a contact type sensor board.

11. The illuminated keyboard according to claim 10, wherein said contact type sensor board comprises:
- a first wiring plate comprising a first circuit pattern, wherein plural first contacts are formed on said first circuit pattern;
- a partition plate comprising plural perforations; and
- a second wiring plate comprising a second circuit pattern, wherein plural second contacts are formed on said second circuit pattern,
- wherein said partition plate is clamped between said second wiring plate and said first wiring plate, wherein each of said first contacts is aligned with a corresponding one of said plural perforations and a corresponding one of said plural second contacts.

12. The illuminated keyboard according to claim 10, wherein said contact type sensor board comprises:
- a first wiring plate comprising a first circuit pattern, wherein plural first contacts are formed on said first circuit pattern; and
- a second wiring plate comprising a second circuit pattern, wherein plural second contacts are formed on said second circuit pattern, wherein plural UV-based dot spacers are printed around each of said plural second contacts,
- wherein each of said plural first contacts is aligned with a corresponding one of said plural second contacts, and said first wiring plate is contacted with said plural UV-based dot spacers, so that a key gap is formed between said first contact and said corresponding second contact.

13. An illuminated keyboard, comprising:
- a sensor board comprising a key wiring region for sensing a touching action of a user and thereby generates a corresponding key signal;
- plural key patterns to be identified by said user, where when one of said key patterns is touched, said key signal is triggered;
- a light source for emitting a light beam; and
- a light guide plate located at a side of said light source for transferring said light beam,
- wherein at least one edge region of said sensor board is bent to enclose at least one edge region of said light guide plate and thereby prevents lateral light leakage of said illuminated keyboard.

14. The illuminated keyboard according to claim 13, wherein said plural key patterns are printed on a surface of said sensor board.

15. The illuminated keyboard according to claim 13, wherein said illuminated keyboard further comprises a patterning substrate, and said plural key patterns are printed on a surface of said patterning substrate.

16. The illuminated keyboard according to claim 13, wherein said bent edge region of said sensor board is coated with a light-shading material or mixed with said light-shading material.

17. The illuminated keyboard according to claim 13, wherein said sensor board is disposed over said light guide plate, and said key wiring region is divided into a key triggering sub-region and a key spacing sub-region, wherein said key spacing sub-region is coated with a light-shading material or mixed with said light-shading material and thereby said light beam is prevented from being leaked out through a region between every two adjacent key patterns.

18. An illuminated keyboard, comprising:
- a sensor board for sensing a touching action of a user and thereby generates a corresponding key signal;
- a first substrate comprising a first electrode pattern;
- a second substrate comprising a second electrode pattern, wherein said second substrate is made of a light-guiding material;
- a spacer layer or a partition plate arranged between said first electrode pattern and said second electrode pattern; and
- a light source for emitting a light beam to said second substrate,
- wherein at least one edge region of said first substrate is bent to enclose at least one edge region of said second substrate and thereby prevents lateral light leakage of said illuminated keyboard.

19. An illuminated keyboard, comprising:
- a sensor board for sensing a touching action of a user and thereby generates a corresponding key signal;
- a first substrate comprising a first electrode pattern;
- a second substrate comprising a second electrode pattern, wherein said second substrate is made of a light-guiding material;
- a partition plate arranged between said first substrate and said second substrate; and
- a light source for emitting a light beam to said second substrate,
- wherein at least one edge region of said partition plate is bent to enclose at least one edge region of said second substrate and thereby prevents lateral light leakage of said illuminated keyboard.

20. An illuminated keyboard, comprising:
- a sensor board for sensing a touching action of a user and thereby generates a corresponding key signal;
- a first substrate comprising a first electrode pattern;
- a second substrate comprising a second electrode pattern;
- a partition plate arranged between said first substrate and said second substrate, wherein said partition plate is made of a light-guiding material; and
- a light source for emitting a light beam to said partition plate,
- wherein at least one edge region of said first substrate is bent to enclose at least one edge region of said partition plate and thereby prevents lateral light leakage of said illuminated keyboard.

* * * * *